No. 624,834. Patented May 9, 1899.
J. LUNDÉN.
VELOCIPEDE.
(Application filed Feb. 9, 1899.)

(No Model.)

Witnesses:

Inventor,
Johan Lundén.

UNITED STATES PATENT OFFICE.

JOHAN LUNDÉN, OF GOTHENBURG, SWEDEN.

VELOCIPEDE.

SPECIFICATION forming part of Letters Patent No. 624,834, dated May 9, 1899.

Application filed February 9, 1899. Serial No. 705,060. (No model.)

*To all whom it may concern:*

Be it known that I, JOHAN LUNDÉN, printer, of Magasinsgatan No. 11, Gothenburg, Sweden, have invented certain new and useful Improvements in Velocipedes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has for its object the provision of means whereby resiliency is imparted to a velocipede or bicycle by placing the driving-wheel in resilient or yielding bearings without materially increasing the friction of the parts.

Figure 1:
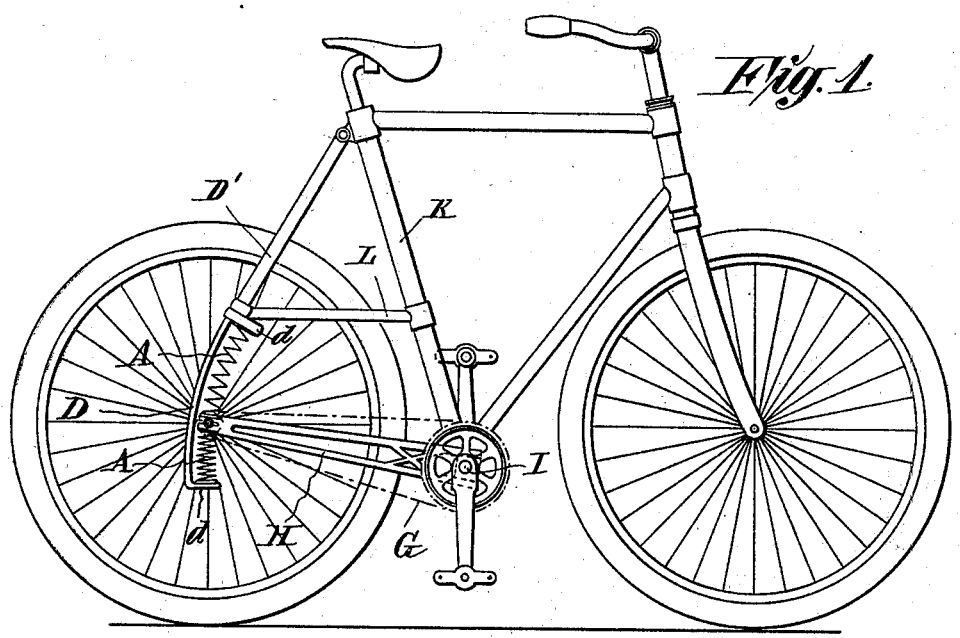
Figure 2:
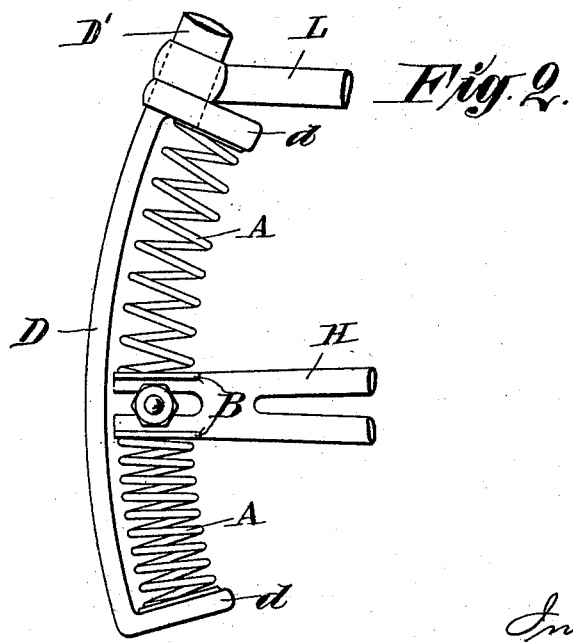

In the drawings, Figure 1 is a side view of a bicycle or velocipede, showing my improvement; and Fig. 2 is a detail, on an enlarged scale, showing the resilient bearing for the rear wheel.

Like letters of reference refer to like parts.

I have shown a diamond-frame wheel in which the rear reaches H are revolubly secured at their forward ends either to the crank-shaft I or to the crank-hanger, and in the rear slotted ends of said reaches is adjustably secured the driving-wheel in the usual manner. On the upper and lower sides of the rear ends of the reaches H are provided bearing-plates B or equivalent devices, in which are fastened the ends of spiral springs A and which at the same time form bearing-surfaces for said springs. The upper ends of the rear braces D' are secured at the top of the saddle-post K and have arc-shaped lower ends D, the center for said arcs being that of the crank-shaft I. At either end of the arcs D are bearing-plates d, in which are fastened and against which bear the other ends of the spiral springs A.

Cross-braces L, connecting the rear braces D' and saddle-post K, serve to make a rigid structure.

The springs A are fastened to and are held between the plates B on the rear reaches H and the plates d on the rear braces D', thus forming a resilient bearing for the rear wheel, which has a limited motion in the arc of a circle around the crank or crank-hanger and readily responds to any unevenness of the road.

Having now particularly described and ascertained the nature of my said invention, what I claim as new therein, and desire to secure by Letters Patent, is—

1. In a bicycle, rear reaches revoluble about the crank-axle, a driving-wheel held in the ends of said reaches, rear braces having arcuate ends, bearing-plates on the ends of the arcs of the braces, bearing-plates on the ends of the reaches, and coil-springs between the bearing-plates on the reaches and those on the arcuate ends of the braces, substantially as described.

2. In a bicycle, a saddle-post, rear reaches revoluble about the crank-axle, a driving-wheel held in the ends of said reaches, rear braces having arcuate ends, bearing-plates at each end of the arcs of the braces, bearing-plates on the ends of the reaches, coil-springs between the bearing-plates on the reaches and those on the arcuate ends of the braces, and cross-braces L, between the rear braces and the saddle-post, substantially as described.

In testimony that I claim the foregoing as my invention I have signed my name in presence of two subscribing witnesses.

JOH. LUNDÉN.

Witnesses:
 GUST. JEANEORY,
 EDO. DEIJCUBERY.